United States Patent
Thienard

(10) Patent No.: US 7,316,047 B2
(45) Date of Patent: *Jan. 8, 2008

(54) CONNECTOR LINKING A WIPER ARM TO A WIPER BLADE

(75) Inventor: Jean-Claude Thienard, Gisors (FR)

(73) Assignee: Valeo Systemes d'Essuyage, LaVerriere (FR)

(*) Notice: Subject to any disclaimer, the term of this patent is extended or adjusted under 35 U.S.C. 154(b) by 47 days.

This patent is subject to a terminal disclaimer.

(21) Appl. No.: 10/544,514

(22) PCT Filed: Feb. 4, 2004

(86) PCT No.: PCT/EP2004/001007

§ 371 (c)(1),
(2), (4) Date: Aug. 4, 2005

(87) PCT Pub. No.: WO2004/069618

PCT Pub. Date: Aug. 19, 2004

(65) Prior Publication Data

US 2006/0048329 A1    Mar. 9, 2006

(30) Foreign Application Priority Data

Feb. 4, 2003    (FR) ................... 03 01292

(51) Int. Cl.
B60S 1/40    (2006.01)

(52) U.S. Cl. .................................. 15/250.32

(58) Field of Classification Search .......... 15/250.32, 15/250.351; 403/3, 4, 321
See application file for complete search history.

(56) References Cited

U.S. PATENT DOCUMENTS

| 5,289,608 A | 3/1994 | Kim |
| 5,392,487 A | 2/1995 | Yang |
| 5,885,023 A * | 3/1999 | Witek et al. ................. 403/321 |
| 6,779,223 B1 * | 8/2004 | Roekens ................... 15/250.32 |

FOREIGN PATENT DOCUMENTS

| DE | 3222891 | * 12/1983 |
| DE | 19812716 | * 1/1999 |
| EP | 0528307 | * 8/1992 |

* cited by examiner

Primary Examiner—Gary K. Graham
(74) Attorney, Agent, or Firm—Osha Liang LLP

(57) ABSTRACT

The invention concerns a connector (36) for linking one end of a wiper arm (32a, 32b, 32c) to a first transverse hinge pin (54) belonging to a structural element (38) of a wiper blade (30), the connector (36), comprising: a first housing (70) wherein the first transverse hinge pin (54) can be inserted; a second housing (84) for receiving a second transverse hinge pin (62), belonging to a second category of arm (32b), said second housing (84) being partly delimited by a first elastically deformable lower tab (86) which extends globally longitudinally, whereof one first longitudinal end (86a) is fixed to the connector and is adapted to be retractable to enable the second pin (62) to be inserted, and to transversely lock the second pin (62) in mounted position in the second housing (84).

28 Claims, 14 Drawing Sheets

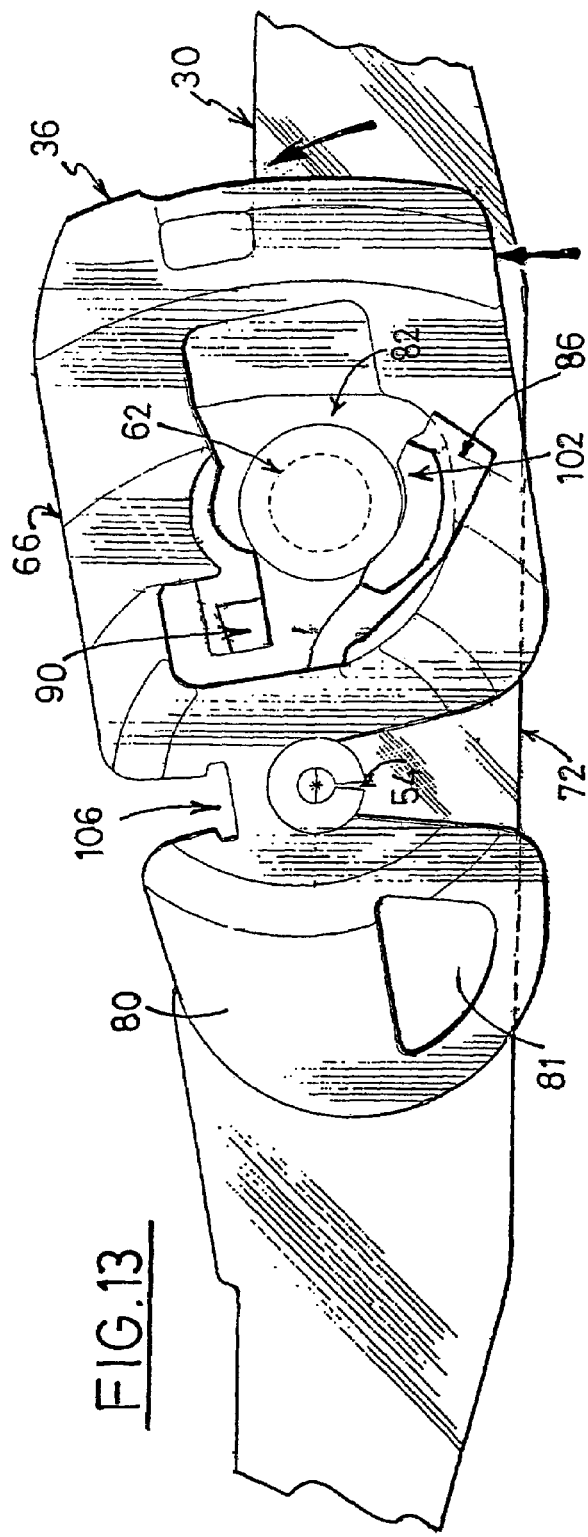
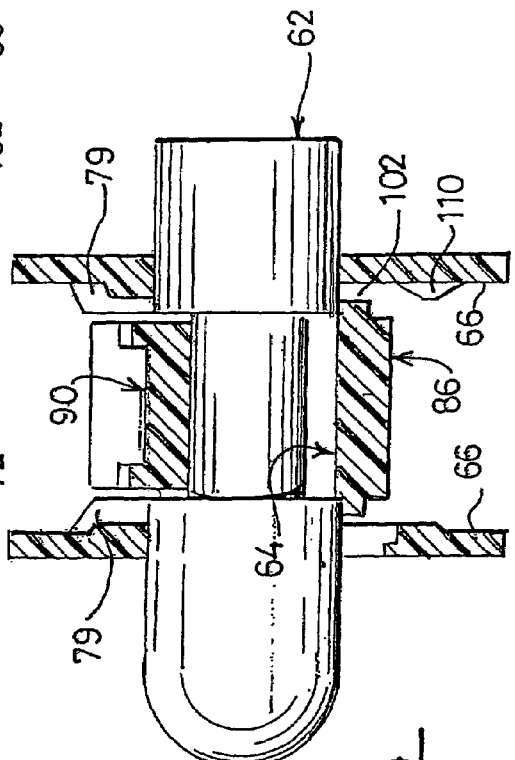

CONNECTOR LINKING A WIPER ARM TO A WIPER BLADE

The present invention relates to a connection piece or "connector" used for connecting the end of a windshield wiper arm to an element of a support structure for supporting the wiper blade proper of the wiper blade unit.

The invention relates more particularly to a connector for connecting one end of a windshield wiper arm to a first transverse hinge pin belonging to a structure element of a wiper blade unit, the connector being suitable for being received at least in part against the inside end wall of the end of an arm that belongs to a first category of arm, which end is in the form of a U-shaped hook, the connector comprising:

a first recess into which the first hinge pin can be inserted; and a second recess designed to receive a second transverse pin which belongs to a second category of arm that can be of at least a first size, and which extends transversely from a side edge of the end of the arm, said second recess being defined in part by a bottom first tongue that is elastically deformable and that extends substantially longitudinally, a first longitudinal end of which tongue is fastened to the connector, the bottom tongue being suitable for retracting so as to enable the second pin to be inserted, and for causing the second pin to be locked transversely in the position in which it is mounted in the second recess.

The increase in the number of types and of shapes of current motor vehicles is causing an increase in the number of categories of arm and an increase in the number of sizes of arm for each category.

The bottom tongue makes it possible, using the same connector, to connect the wiper blade unit to various categories of wiper arm, a first category being a category in which the end of the arm is U-shaped, and a second category being a category in which the end of the arm carries a transversely extending pin.

By using adapter means, the connector is particularly well adapted for receiving arms of the first category that can be of numerous different sizes. However, it is not adapted for receiving ends of arms of the second category that are of a plurality of sizes.

In a known design that is described in document WO-A-01 15946, the bottom tongue is suitable for deforming elastically to receive the transverse pin on the end of the arm. Thus, in order for the connector to be suitable for receiving a second transverse pin of a larger size, i.e. of larger diameter, the bottom tongue must be designed to deform through a larger amplitude.

This means that, when the connector receives a pin of a first size that is the smallest size, the amplitude through which the bottom tongue deforms is small. Thus, the resilient return force enabling the bottom tongue to be held in the peripheral groove in the pin is smaller than the force generated when the connector receives a pin of a second size that is greater than the first size.

In addition, due to the small dimensions of a pin of the first size, the depth of the groove that receives the bottom tongue is relatively small, which means that the bearing surface area via which the tongue bears against the walls of the groove is also small.

Therefore, when the connector receives a pin of the first size, the locking achieved by the bottom tongue is ineffective in comparison with the locking achieved when the connector receives a pin of the second size, for which the resilient return force and the bearing surface area via which the tongue bears against the walls of the groove are larger.

That is why it is proposed to use a connector adapted to each size of pin.

Since wiper blade units are elements that wear quickly, users need to replace them regularly. For that purpose, new wiper blade units accompanied by connectors are commercially available. Since manufacturers cannot know either the category or the size of the windshield wiper arm of the vehicle of the driver, manufacturers are therefore obliged to put a plurality of connectors in the same packaging that make it possible to connect a wiper blade unit to all of the categories and sizes of arms.

Of the connectors supplied in the packaging, only one will be used to connect the wiper blade unit to the wiper arm, and the others, which are of no use, will be discarded.

Thus, manufacturers are certain to sell connectors of which a portion will be thrown away automatically, thereby resulting in wastage of the raw material sold, which could have been used to manufacture other connectors.

To avoid that, an object of the invention is to propose a connector that, on its own, makes it possible to connect a wiper blade unit to one end of a wiper arm, from among a plurality of categories of arm and from among a plurality of sizes of arm.

To this end, the invention provides a connector of the above-described type, characterized in that it comprises a top tongue that is suitable for being received at least in part in a peripheral groove in the second pin so as to lock the second pin transversely, in association with the bottom tongue.

According to other characteristics of the invention:

the connector comprises adapter means so that it is suitable for being received against the inside end walls of ends of arms of the first category and of various sizes;

the adapter means comprise shapes in relief provided on the facing inside longitudinal faces of side cheek plates of the connector;

the top tongue is of transverse width complementary to the width of the annular groove in the second pin so as to be received snugly in the groove;

the top tongue is connected to each of the cheek plates of the connector via films of material whose dimensions are determined so that inserting a second pin of the first size does not cause the films of material to break;

the body comprises a front segment that defines the first recess, the front outside wall of the front segment being suitable for being received against the inside end wall of the U-shaped hook of the arm, a top rear segment and a bottom rear segment;

the front longitudinal end of the bottom tongue is fastened to the front segment;

the rear longitudinal end of the top tongue is fastened to the rear top segment;

the connector is suitable for receiving the end of a third category of arm, which end consists in a shaped-section member segment that extends substantially longitudinally forwards, in a cylindrical third recess that is open in its rear face;

an arm of the third category being inserted into the third recess causes the films of material to break;

the rear top segment is provided with a vertical orifice that is suitable for receiving a lug on the end of an arm belonging to the third category of arm, which lug projects upwards relative to the top face of the end of the arm, for longitudinally locking the end of the arm in the position in which it is mounted in the third recess;

a portion of the bottom tongue is curved downwards so that, for at least one size of arm belonging to the first category of arm, the bottom tongue is deformed elastically upwards so as to exert a substantially vertical force downwards on the top face of a horizontal bottom segment of the end of the arm;

the top tongue comprises two side studs disposed on either side of the front longitudinal end of the top tongue, which studs extend transversely towards the outside of the connector and pass through respective orifices in the associated side cheek plates so that the free end of each stud comes flush with the outside vertical face of the associated cheek plate;

when an arm belonging to the third category of arm is in the position in which it is mounted in the third recess, each of the side studs is in vertical abutment against a top edge of the orifice of the associated cheek plate;

the side edges of the bottom tongue are extended transversely outwards by projections;

the projections of the bottom tongue extend transversely while passing through an orifice in the associated side wall so that the free transverse end of each projection comes flush with the outside vertical face of the associated cheek plate;

each projection is curved so that the curvature of its top face is substantially complementary to the outside cylindrical wall of a second pin of the second size;

the free front end of the top tongue is curved downwards so that when the end of an arm belonging to the third category of arm is inserted into the third recess, the top tongue is deformed elastically upwards, and the free front end of the top tongue exerts a return force directed substantially downwards on the top face of the end of the arm;

the front end segment of each cheek plate, which segment extends cantilevered out forwards from the body, is elastically deformable and, on its inside vertical longitudinal face, comprise a ramp-forming abutment so as to retract when the end of an arm belonging to the first category of arm is inserted, and so as to lock the U-shaped hook in the position in which it is mounted around the body of the connector;

the ramp-forming abutment extends over a top portion of the front end segment of the associated cheek plate, and a bottom portion of the front end segment comprises an opening for insertion of the U-shaped hook;

the shapes in relief comprise a rib provided on the inside vertical longitudinal face of each cheek plate of the connector, which rib extends longitudinally above the top face of the rear top segment of the body for positioning the end of an arm belonging to the first category of arm;

the bottom face of the bottom tongue comprises ribs for vertically and/or transversely positioning an arm of the first category and of at least one size;

each positioning rib extends substantially vertically downwards along a side edge of the bottom face of the bottom tongue;

each of the side studs comprises a bearing surface for bearing against the outside cylindrical surface of a second pin of the second size, which bearing surface is complementary to said outside cylindrical wall;

the curvature of a top edge of the opening in a cheek plate is substantially identical to the curvature of the outside cylindrical wall of a second pin of the second size;

each cheek plate comprises a notch which extends vertically downwards from its top edge and which is complementary to a manipulator element for manipulating the connector;

the notch substantially forms an upside-down T-shape in which the bottom edge of the horizontal branch extends vertically above the top face of the front element of the body of the connector;

the ribs extend longitudinally forwards so as to extend to the front end of the front segment of the body of the connector; and the connector comprises a cross-member that interconnects the rear bottom ends of the cheek plates.

Other characteristics and advantages of the invention will appear on reading the following detailed description which, in order to make it easier to understand, is given with reference to the accompanying figures, in which:

FIG. 13 is a view similar to the FIG. 11 view, showing a step for disassembling an arm of the third category;

FIG. 14 is a cross-section view of the connector that carries an arm of the third category;

Figure 1:
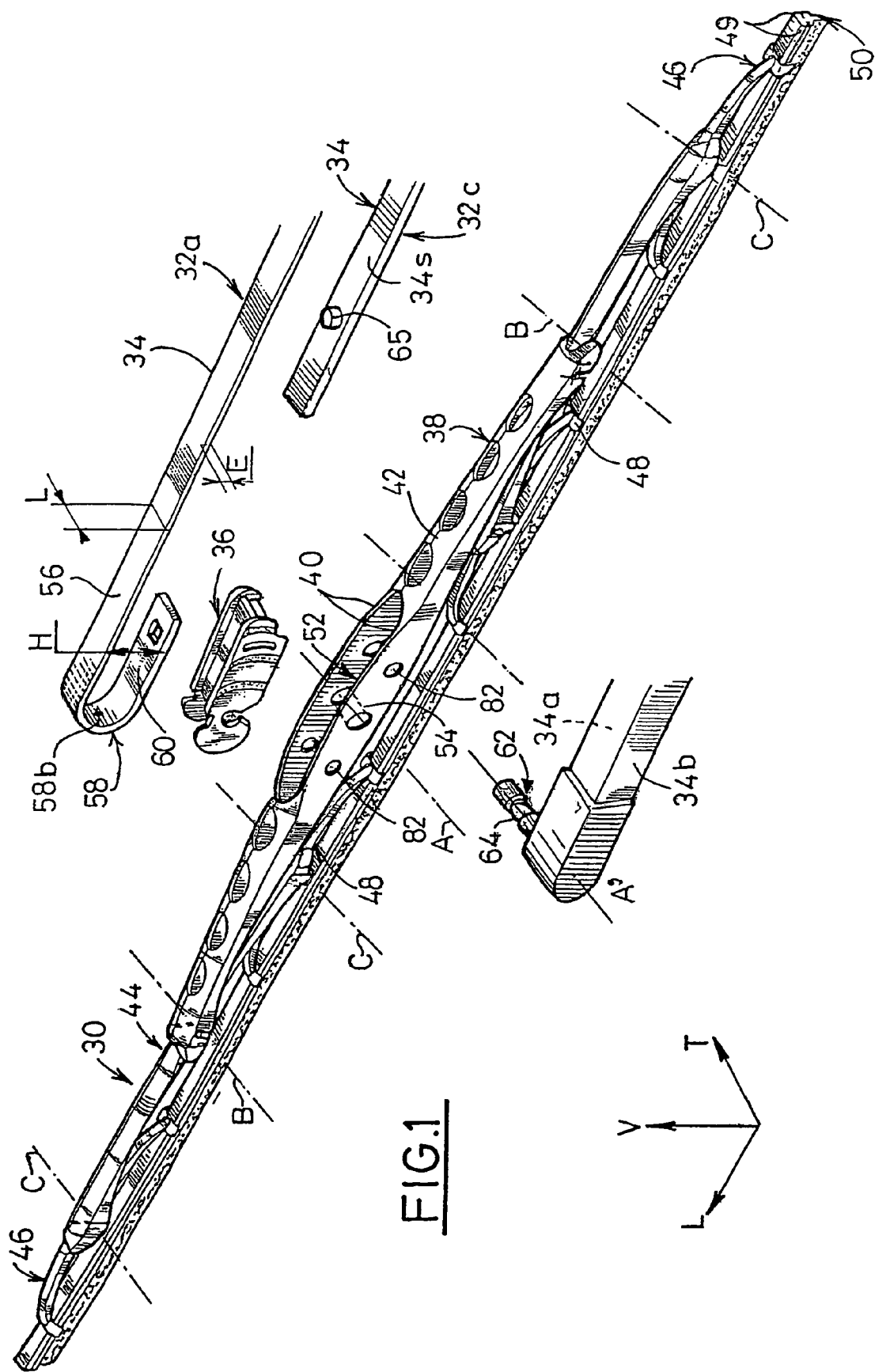
FIG. 1 is a diagrammatic exploded perspective view of a windshield wiper, showing a wiper blade unit and the various categories of arms that can be connected to the wiper blade unit via a connector of the invention.

For the description of the invention, the vertical, longitudinal, and transverse directions are adopted in non-limiting manner, using the frame of reference V, L, T indicated in FIG. 1.

The rear-to-front direction is also adopted as being the longitudinal direction, and from right to left with reference to FIG. 1.

In the description below, elements that are identical, similar or analogous are designated by like references.

FIG. 1 shows a wiper blade unit 30 designed to be mounted to pivot about a transverse axis A at the front longitudinal end 34 of a windshield wiper arm 32a, 32b, 32c via an adapter connector 36.

The wiper blade unit 30 comprises a main bracket 38 provided with two parallel longitudinal flanges 40 interconnected by a transverse top back 42.

At each of its longitudinal ends, the main bracket 38 carries yokes 44 mounted to pivot about transverse axes B and themselves carrying secondary yokes 46 at their ends, which secondary yokes are mounted to pivot about transverse axes C.

At its longitudinal ends, each of the secondary yokes 46 comprises fastening claws 48 for fastening to metal spine members 49 for supporting a wiper blade proper 50 made of a flexible elastomer material.

The main bracket 38, the yokes 44 and the secondary yokes 46 form a hinged structure which is deformable in a longitudinal plane that lies substantially perpendicular to the general plane of the glazing to be wiped (not shown), and which, by means of the spine members 49, makes it possible to press the blade proper 50 over its entire length against the glazing while distributing the contact pressure uniformly between the wiper blade proper 50 and the glazing over the entire length of the wiper blade unit 30.

In its central portion, the main bracket 38 of the wiper blade unit 30 is provided with a top opening 52 formed in its top back 42 and in which a transverse rod 54 is provided that interconnects the two flanges 40 and that forms a first transverse axis A about which the wiper blade unit 30 is mounted to pivot relative to the wiper arm 32a, 32b, 32c.

FIG. 1 also shows the free ends 34 of three different windshield wiper arms 32a, 32b, 32c, each of which represents a category of windshield wiper arm existing on current motor vehicles, each of which is suitable for receiving the wiper blade unit 30 via the same connector 36.

A first category of arm 32a is constituted by a type of arm that has its end in the form of a U-shaped hook, and comprising a horizontal top branch 56 extending substantially horizontally forwards, a curved C-shaped intermediate branch 58 whose top end is connected to the front longitudinal end of the top branch 56, and a horizontal bottom branch 60 that extends longitudinally rearwards from the bottom end of the intermediate branch 58.

The arms 32a of said first category can be of a plurality of sizes, each of which is defined by the width L and by the thickness E of each branch. In the following description, reference is made to three different arm sizes. For each size, the group (L; E; H) formed by the values in millimeters (mm) of the width L, of the thickness E, and of the height H of the hook is a respective one of the following groups: (9; 3; 6.7); (9; 4; 10.7); and (8; 3; 6.7).

A second category of arm 32b is constituted by a type of arm that has its end 34 extending longitudinally forwards and carrying, on one of its side faces 34a, a transverse pin 62 having an outside cylindrical surface that is provided with a peripheral groove 64 of rectangular section.

The arms 32b of the second category can be of a first size or of a second size, each size corresponding to a respective outside diameter for the pin 62. In the following description, the arm 32b of the first size is the arm for which the outside diameter of the pin 62 is the smaller, i.e. 4.8 mm in this example, and the arm 32b of the second size is the arm for which the outside diameter of the pin 62 is the larger, i.e. 6.35 mm in this example.

Finally, a third category of arm 32c is constituted by a type of arm that has its end 34 consisting of a single horizontal longitudinal segment of rectangular cross-section, and carrying an upwardly projecting lug 65 on its top face 34s.

The connector 36 makes it possible to connect the wiper blade unit 30 to any of the arms 32a, 32b, 32c belonging to the respective categories of arms and of any one of the above-mentioned sizes.

In a known manner, the connector 36 is formed in one piece by molding, generally by molding a plastics material.

Figure 2:
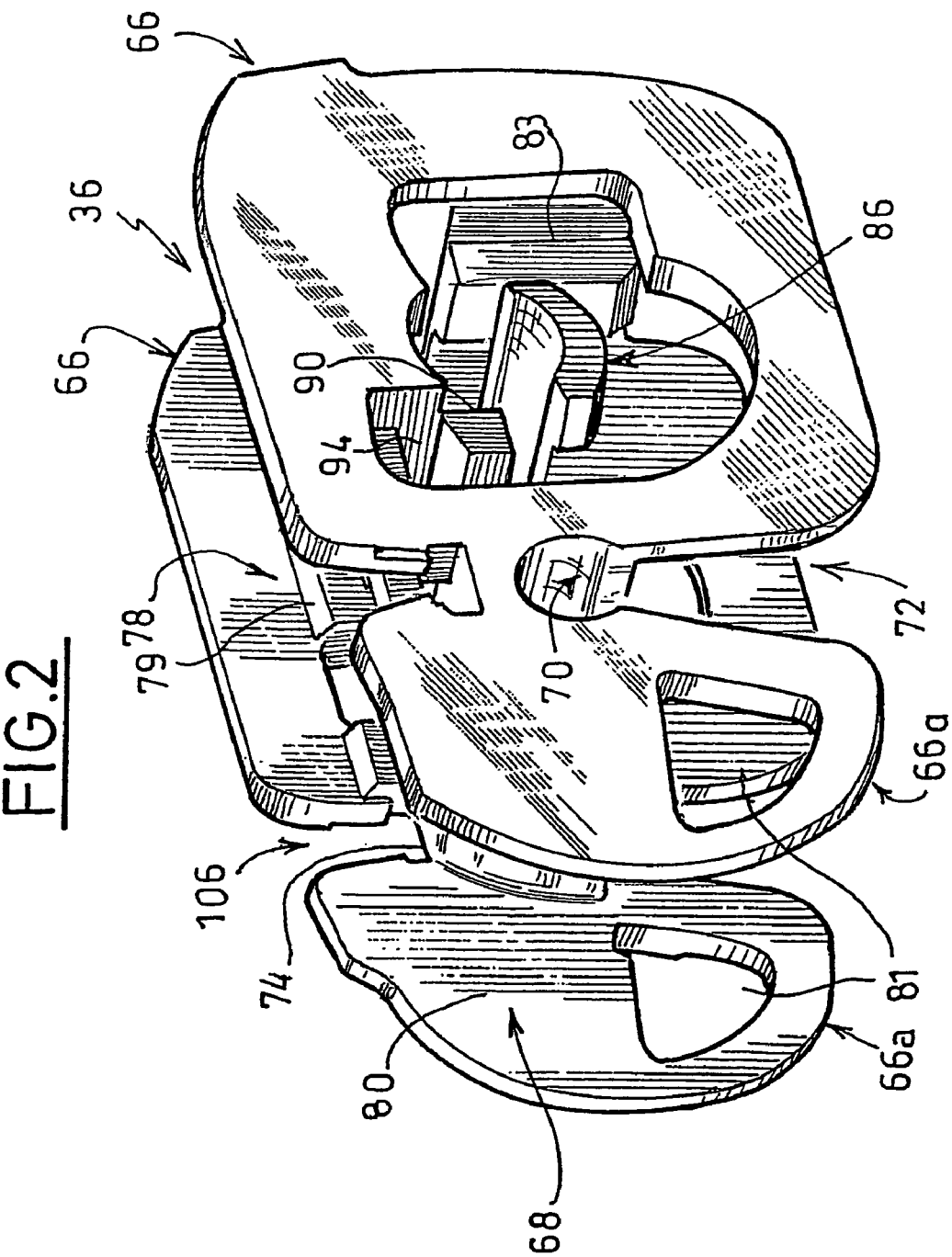
FIG. 2 is a diagrammatic perspective view of the connector of the invention.
Figure 3:
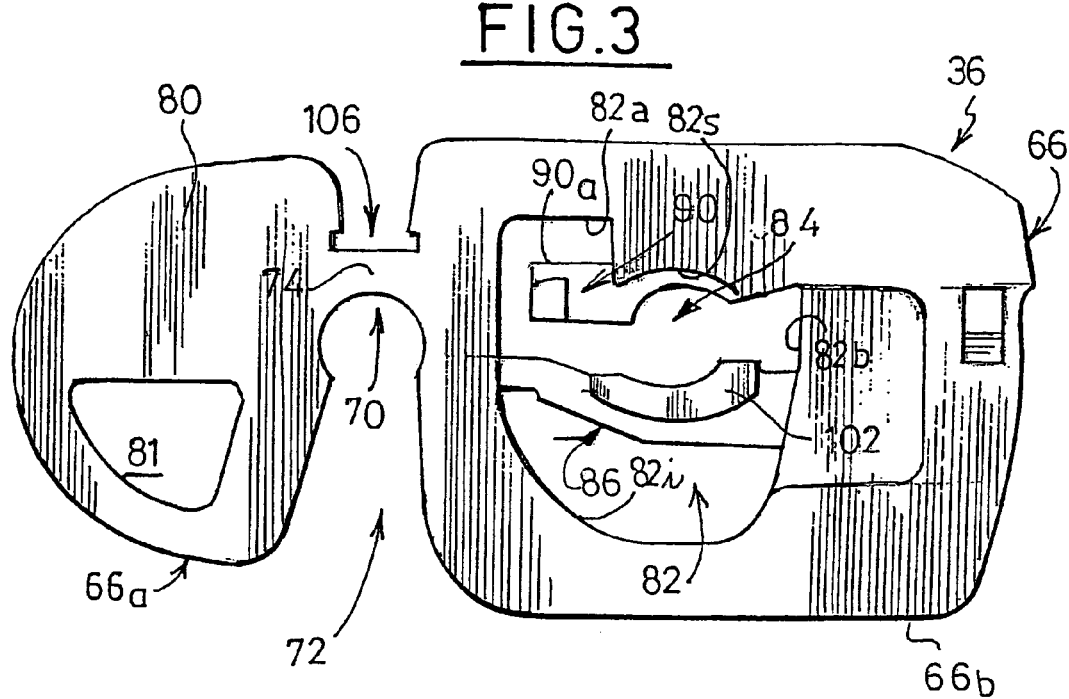
FIG. 3 is a side view of the connector shown in FIG. 2.
Figure 4:
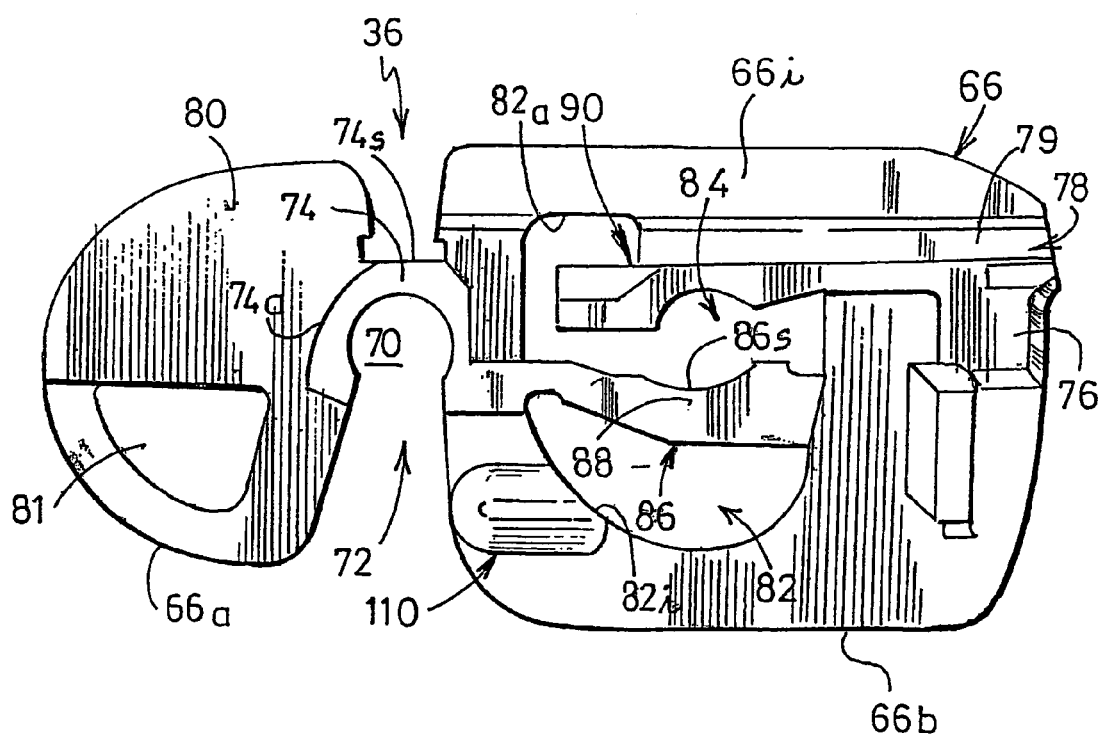
FIG. 4 is a longitudinal section view of the connector shown in FIG. 3.
Figure 5:
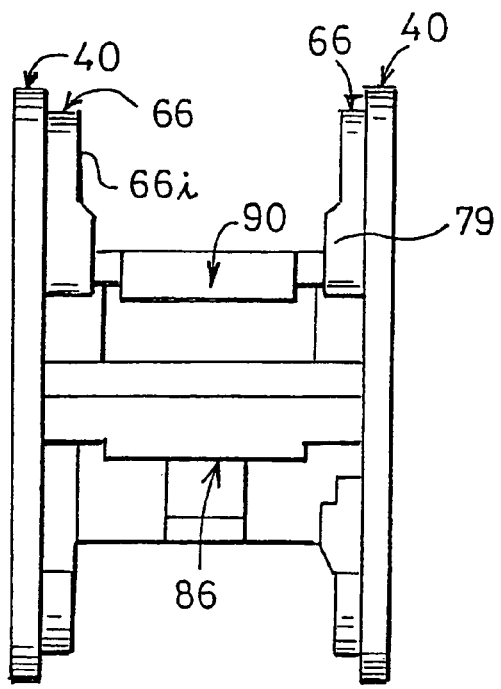
FIG. 5 is a cross-section view of the connector shown in the position as mounted in the wiper blade unit.

As can be seen in more detail in FIGS. 2 to 4, the connector comprises two parallel vertical side cheek plates 66 that are designed to be received snugly through the opening 52 in the back 42 of the main bracket 38, between the two flanges 40 of the main bracket 38, so as to position the connector 36 transversely relative to the main bracket 38 of the wiper blade unit 30.

The two side cheek plates 66 are interconnected by a transverse body 68 which defines a first cylindrical recess 70 that is complementary to the first hinge pin 54, and into which the transverse pin 54 defining the first transverse hinge axis A can be inserted radially.

For this purpose, the first recess is open along its bottom transverse generator line, and each of the two cheek plates 66 comprises an opening 72 that extends vertically downwards from the first recess 70 to the bottom edge 66b of the associated cheek plate 66. The longitudinal dimension of the first recess 70 is determined so that the distance between its longitudinal edges 70a is less than the outside diameter of the first hinge pin 54, the first hinge pin 54 being inserted into the first recess 70 by the body 68 deforming elastically.

As can be seen in more detail, in particular in FIG. 4, the body 68 is made up of a front first segment 74 that defines the first recess 54, and of a rear second segment 76 that extends longitudinally and horizontally behind the front segment 74 so that its top face 76s is disposed substantially at the same height, in the vertical direction, as the top face 74s of the front segment 74.

In order to connect the wiper blade unit 30 to an arm 32a belonging to the first category of arm, the body 68 of the connector 36 is suitable for being received against the inside end wall of the end of the arm 32a in the form of a U-shaped hook, the two cheek plates 66 of the connector 36 being disposed transversely on either side of the end 34 of the arm 32a.

For this purpose, the front cylindrical face 74a of the front segment 74 is convex and is shaped so that, when the connector 36 is received in the end 34 of the arm 32a, at least one transverse generator line of the front cylindrical face 74a is in contact with the concave rear cylindrical face 58b of the intermediate branch 58 of the arm 32a.

In addition, shapes in relief 78 are provided on the facing inside vertical longitudinal faces 66i of the side cheek plates 66 for positioning the connector 36 vertically and transversely relative to the end 34 of the arm 32a.

The shapes in relief 78 comprise firstly a rib 79 that extends longitudinally above the top face 76s of the rear segment of the body, and behind the top face 74s of the front segment 74 of the body 68.

The two ribs 79 are of rectangular section, and their dimensions are determined so that the distance between their facing vertical longitudinal faces is equal to the smallest width L of the arm 32a of the first category, i.e. 8 mm in this example.

Thus, when the U-shaped hook is in the position in which it is mounted around the body 68 of the connector 36, the top branch 56 of the U-shaped hook bears against the top horizontal longitudinal faces of the two ribs 79 when the width L of the arm 32a is the largest, and the top branch 56 of the U-shaped hook bears against the top face 76s of the rear segment when the width L of the arm is the smallest width.

As shown in FIG. 4, the shapes in relief 78 further comprise at least one projection 110 which makes it possible, depending on the size of the arm 32a, to position the bottom branch 60 of the U-shaped hook vertically or transversely.

Figure 19:
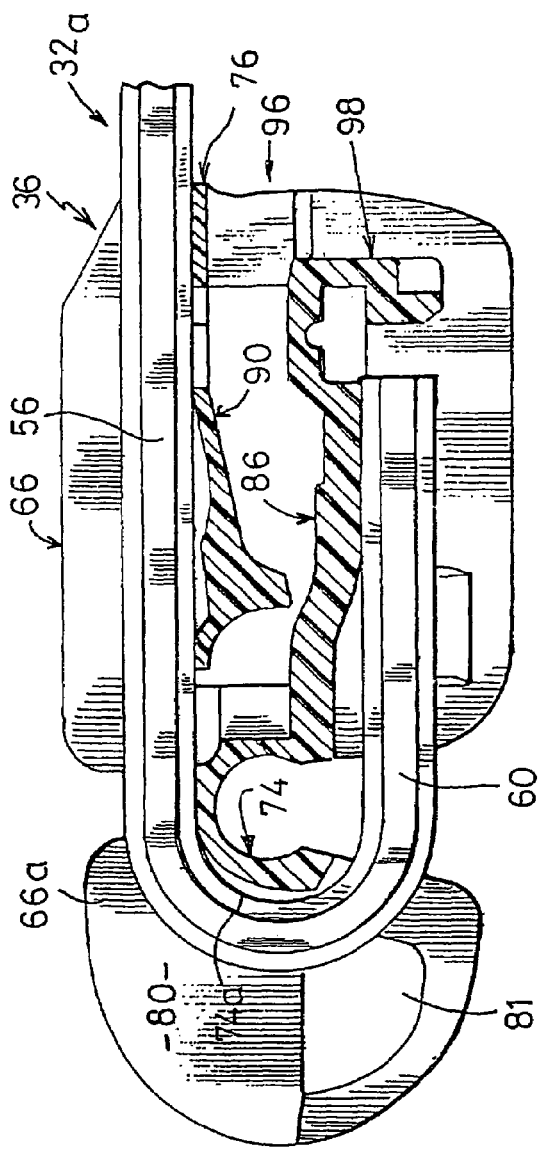
FIG. 19 is a longitudinal section view of the connector as carrying an arm of the first category.
Figure 20:
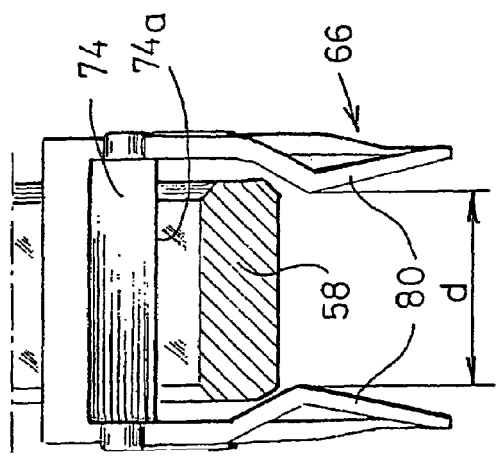
FIG. 20 is a detail view in horizontal longitudinal section showing the connector and the arm shown in FIG. 19, and showing how the V-shaped abutment also locks the hook longitudinally.

As shown in FIGS. 19 and 20, in order to lock the U-shaped hook in the position in which it is mounted around the body 68 of the connector 36, each cheek plate 66 extends longitudinally in front of the body 68 and, on its inside vertical longitudinal face 66i, it comprises a ramp-forming abutment 80 whose dimensions are determined so that the distance "d" between the inside ends of the two ramps 80 is less than the smallest width L of the arm 32a.

Each abutment 80 consists of a portion of the front end segment 66a of the cheek plate 66 that is cantilevered out in front of the body 68 and that is deformed towards the inside of the connector 36, in V-shaped manner. Thus, the abutment 80 keeps a thickness identical to the thickness of the associated cheek plate 66. This is a major advantage when the connector 36 is formed by molding because the abutment 80 has no extra thickness that might be detrimental to its strength.

In addition, the abutment 80 extends over the top portion of the front segment 66a of the associated cheek plate 66, and the bottom portion of the front segment 66a of the cheek plate 66 is provided with an opening 81.

By means of this opening 81, on inserting the U-shaped hook around the body 68, the bottom branch 60 of the U-shaped hook does not come into contact with the abutments 80. This makes it possible to position the U-shaped hook vertically relative to the body 68 of the connector 36, without the user having to perform complex manipulations, and before the U-shaped hook is finally inserted around the body 68 of the connector 36.

The front end 66a of each cheek plate 66 that extends cantilevered out in front of the body 68 is elastically deformable so that, while the U-shaped hook is being inserted around the body 68 of the connector 36, the front segments 66a of the two cheek plates 66 deform elastically by moving apart from each other, and, when the U-shaped hook is in the position in which it is mounted around the body 68 of the connector 36, the front segments 66a of the two cheek plates 66 return resiliently to their original shapes.

Thus, the ramp-forming abutments 80 longitudinally lock the U-shaped hook in the position in which it is mounted around the body 68 of the connector 36.

Also, the ramp-forming abutments 80 are provided longitudinally on the inside faces 66i of the cheek plates 66 so that, when the U-shaped hook is in the position in which it is mounted around the body 68 of the connector 36, the front face 58a of the curved intermediate branch 58 of the U-shaped hook bears against the rear face 80b of each abutment 80, regardless of the size of the arm 32a.

When an arm 32b belonging to the second category of arm is connected to the wiper blade unit 30, its transverse pin 62, which is referred to below as the "second transverse pin", passes through a opening 82 which is provided in each longitudinal flange 40 of the main bracket 38, the side face 34a of the arm 32b that carries the second hinge pin 62 coming into abutment against the facing vertical longitudinal face 40a of a flange 40 of the bracket 38.

Thus, the wiper blade unit 30 is hinged to the arm 32a to pivot about a second transverse axis A' defined by the second pin 62 of the arm 32b. The function of the connector 36 is then merely to lock the second pin 62 transversely relative the wiper blade unit 30.

As can be seen in particular in FIGS. 2 to 4, the body 68 of the connector 36 defines a second recess 84 of transverse axis and into which the second pin 62 can be inserted transversely. The second recess 84 in the body 68 is defined in part by the bottom face 76i of the rear top segment 76 of the body 68, which face is provided with a concave portion 85, and it is also defined in part by a bottom tongue 86 which extends longitudinally rearwards from the front segment 74 of the body 68, facing the rear segment 76 of the body 68, the top face 86s of the tongue being provided with a concave portion 88 facing the concave portion 85 of the rear segment 76.

The bottom tongue 86 is elastically deformable so as to retract to enable the second pin 62 to be inserted into the second recess 84, and, when the second pin 62 is in the position in which it is mounted in the second recess 84, it is suitable for exerting a locking force that tends to press the second pin 62 against the bottom face 76i of the rear segment 76 of the body 68.

In order to lock the second pin 62 relative to the wiper blade unit 30, the connector 36 has a locking element that is suitable for being received in part in the peripheral groove 64 in the second pin 62 when said second pin is in the position in which it is mounted in the second recess.

In the invention, as shown in particular in FIGS. 2 to 4, the locking element consists of a top tongue 90 which is also elastically deformable and which extends longitudinally forwards from the front longitudinal end of the rear segment 76 of the body 68 of the connector 36, and, in a preferred embodiment, the front longitudinal end 90a of the top tongue 90 is provided longitudinally behind the front segment 74 of the body 68.

The top tongue 90 is elastically deformable so as to retract upwards to enable a second pin 62 to be inserted, and so as to be received snugly in the peripheral groove 64 in the second pin 62 so as to lock the second pin 62 transversely, in association with the bottom tongue 86.

For this purpose, the transverse width of the top tongue 90 is complementary to the width of the annular groove 64 in the second pin 62.

Figure 7:
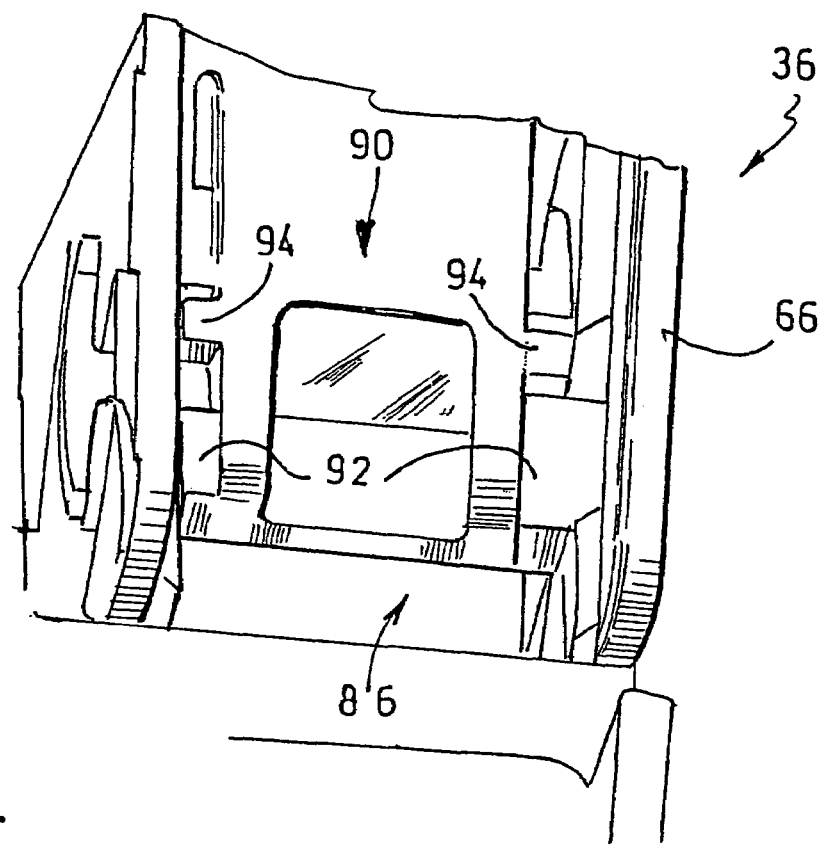
FIG. 7 is a detail view on a larger scale of the connector of FIG. 6, showing the front end of the top tongue.

In addition, as shown in FIGS. 3 and 7, in order to limit the deformation of the top tongue 90 in the horizontal plane, the front longitudinal end 90a of the top tongue 90 is provided with two side studs 92 disposed on either side of the top tongue 90 and that extend transversely towards the outside of the connector 36 while passing through respective associated openings 82 in each cheek plate 66 of the connector 36 so that the free transverse end of each side stud 92 is flush with the outside longitudinal vertical face 66e of the associated cheek plate 66.

Thus, when the connector is in the position in which it is mounted through the opening 52 in the back 42 of the main bracket 38 of the wiper blade unit 30, the free end of each side stud 92 is in abutment against the inside vertical longitudinal face of a flange 40 of the main bracket 42 of the wiper blade unit 30, thereby transversely locking the top tongue 90.

While the windshield wiper is being used, vibration is generated that is transmitted to the connector 36 and that tends to cause the bottom tongue 86 and the top tongue 90 to oscillate.

Due to the small dimensions of a second pin 62 of small size, the depth of the groove 64 is relatively small.

Thus, the top tongue 90 oscillating can lead to it coming out of the groove 64 in the second pin 62, at least temporarily, the second pin then no longer being locked transversely, which, with time in use, can cause the wiper blade unit 30 to be disunited from the arm 32b.

Figure 6:
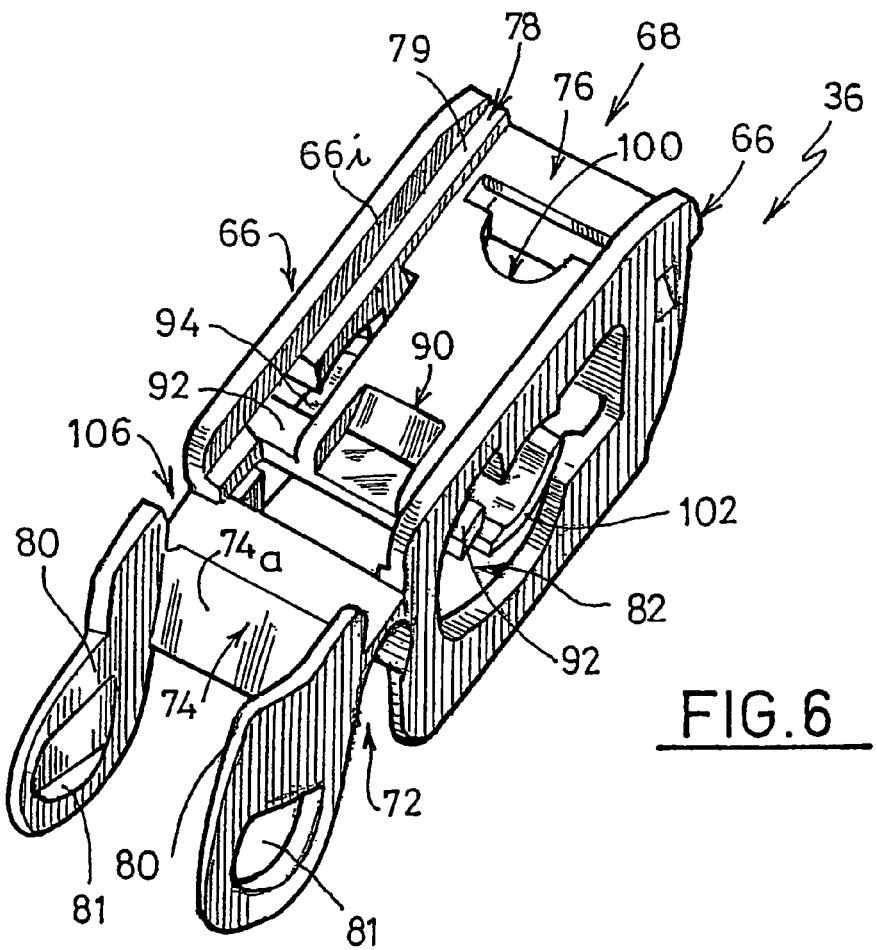
FIG. 6 is a diagrammatic perspective view from above, showing the connector of FIG. 2.

That is why, in another aspect of the invention, and as can be seen in FIGS. 6 and 7, the front end 90a of the top tongue 90 is connected to the side cheek plates 66 of the connector 36 via films of material 94, thereby making it possible to limit or even to prevent the oscillations of the top tongue 90.

The dimensions of said films of material 94 are determined in a manner such that, when a second pin 64 is inserted into the second recess 84, the upward deformation of the top tongue 90 does not cause the films of material 94 to break.

When the second recess 84 receives a second pin 62 of the second size, the depth of the groove 64 is sufficiently large for the oscillations of the top tongue 90 not to be large enough to result in the wiper blade unit 30 disuniting from the arm 32b.

Thus, it is not necessary for the films of material 94 to retain the top tongue 90, when a second pin 62 of the second size is inserted into the second recess 84. The films of material 94 are broken on inserting such a second pin 62.

However, in a variant of this aspect of the invention, inserting a second pin 62 of the second size into the second recess 84 does not cause the films of material 94 to break, so as to prevent oscillations of the top tongue 90 even in the presence of a second pin 62 of the second size.

In order to connect the wiper blade unit 30 to an arm 32c belonging to the third category of arm, the connector 36 is provided with a third recess 96 that is substantially cylindrically symmetrical but of rectangular cross-section that is complementary to the cross-section of the arm 32c, whose major axis is longitudinal and which is open in its rear face so that the end 34 of the arm 32c can be inserted longitudinally forwards.

Figure 15:
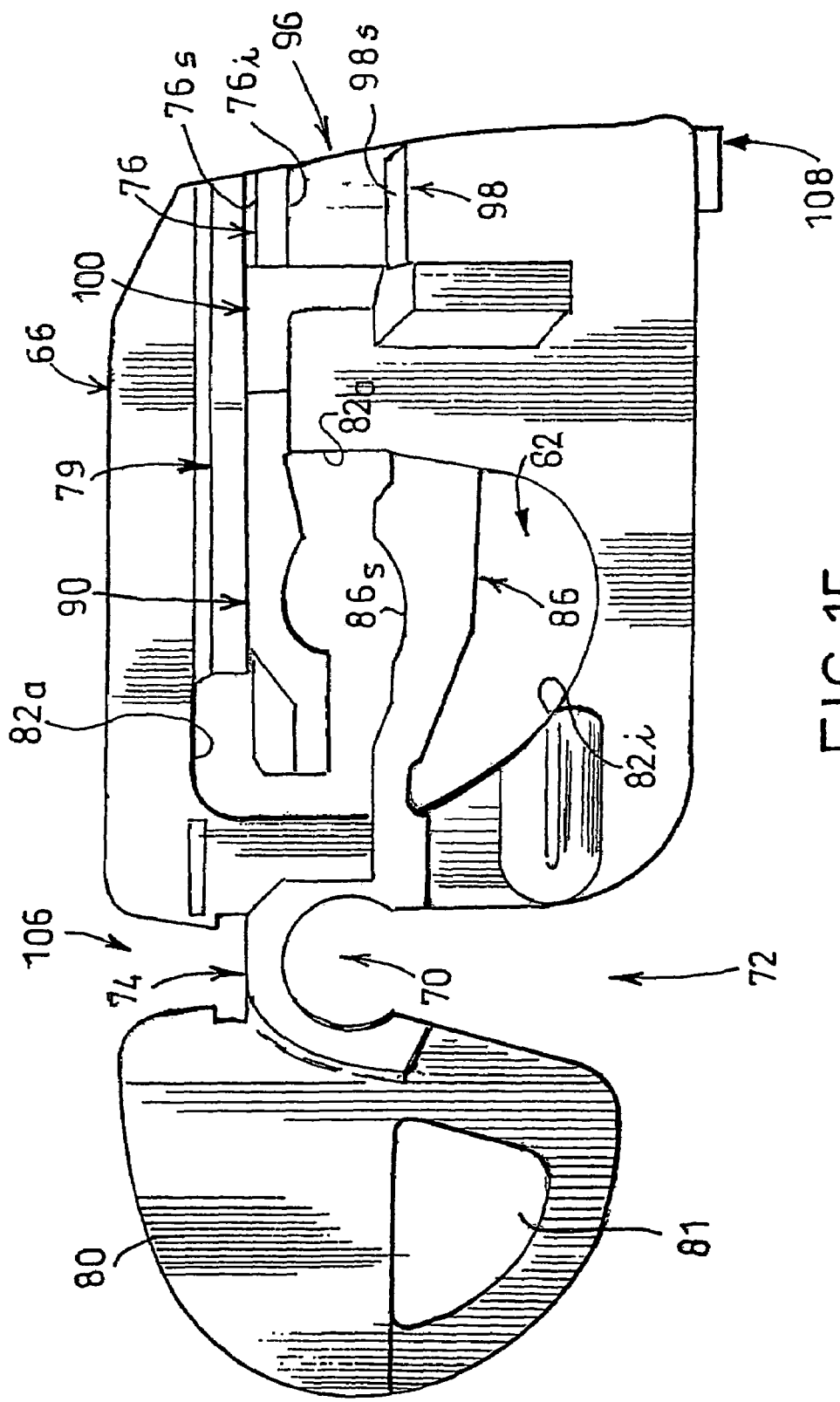
FIG. 15 is a longitudinal section view of another embodiment of the connector of the invention.
Figure 16:
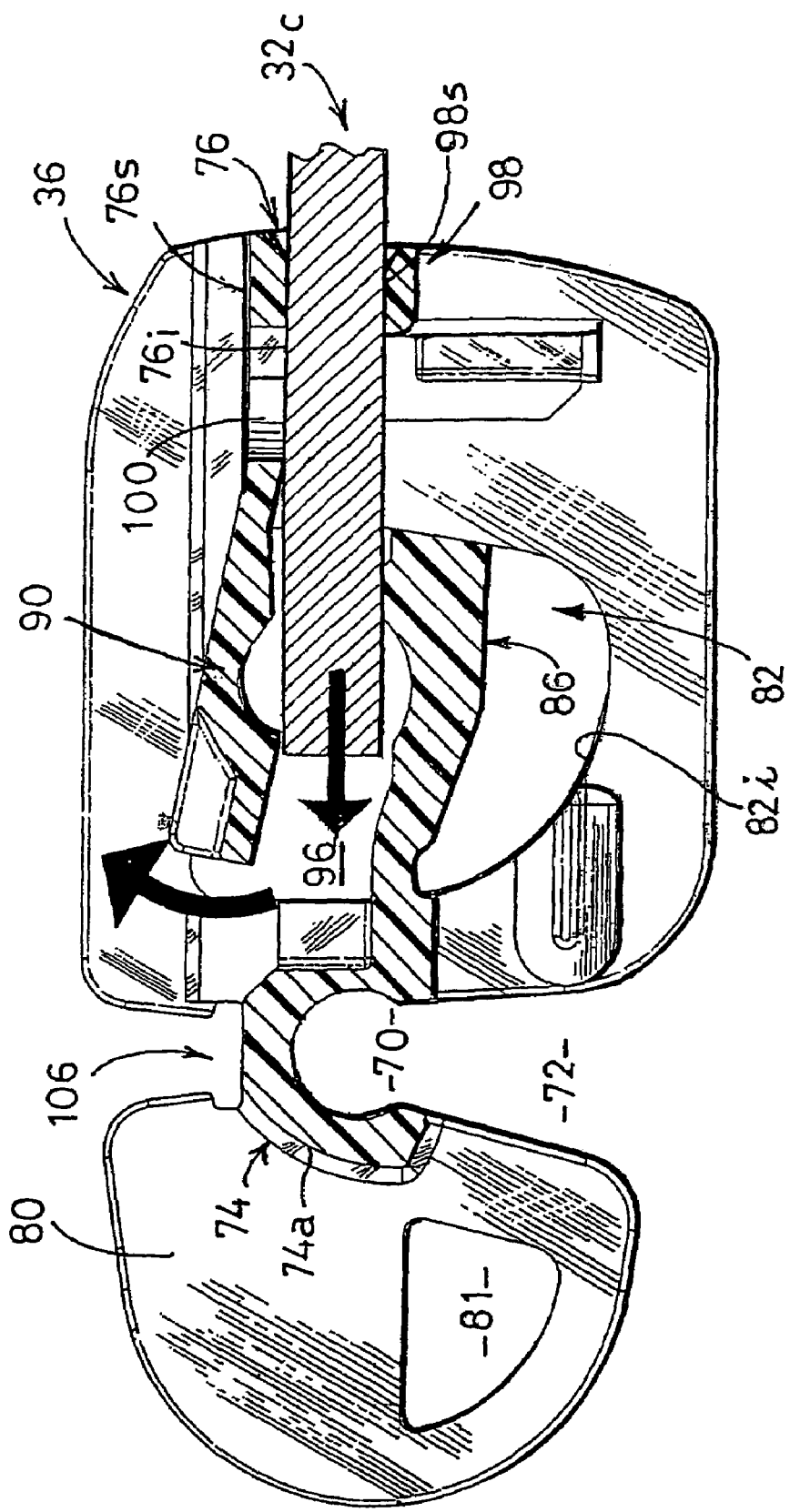
FIG. 16 is a view similar to the FIG. 15 view, showing how an arm of the third category is inserted into the third recess.

As can be seen in FIGS. 15 and 16, the third recess 96 is defined by the front segment 74, by the bottom face 76i of the rear top segment 76, and by the top face of a rear bottom segment 98 of the body 68 of the connector 36.

The third recess 96 is also defined by the facing inside vertical longitudinal faces 66i of the cheek plates 66 of the connector 36.

In a known manner, an arm 32c belonging to the third category of arm is locked longitudinally by means of the lug 65 that is received in a complementary orifice 100 formed in the rear top segment 76.

In general, the connector 36 is designed with dimensional differences so as to enable an arm 32a, 32b, 32c to be mounted without any significant difficulty.

However, once the arm 32a, 32b, 32c is in the position in which it is assembled with the connector 36, the dimensional differences result in clearance between the connector 36 and the arm 32a, 32b, 32c, and, when the windshield wiper is in use, that clearance is the source of vibration causing premature wear on the wiper blade proper 50, or unpleasant noise.

That is why clearance take-up means are provided for taking up the clearance between the arms 32a, 32b, 32c and the connector 36, which means make it possible to limit, or even to reduce such vibration.

A first embodiment of said clearance take-up means consists of a bottom portion 86i of the bottom tongue 86 that is curved downwards, so that, when an arm 32a belonging to the first category of arm is in the position in which it is mounted around the body 68 of the connector 36, the bottom tongue 86 exerts a force directed downwards on the top face 60s of the horizontal bottom segment 60 of the U-shaped hook.

Figure 8:
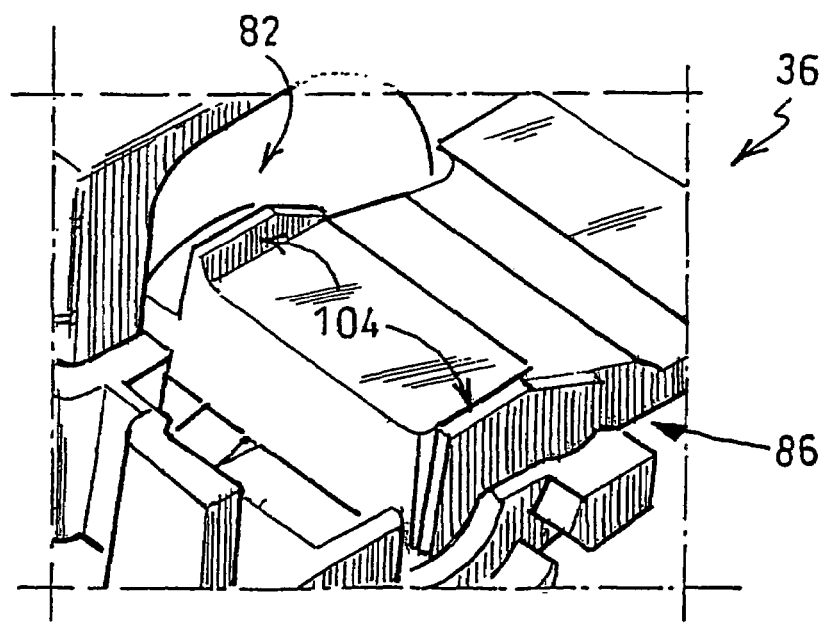
FIG. 8 is a detail view of the bottom tongue on a larger scale, in perspective, and seen from below.

FIG. 8 shows another variant embodiment of the connector 36, in which positioning ribs 104 for positioning the bottom tongue 86, which ribs extend vertically downwards along each side edge of the bottom tongue 86, make it possible to position the arm 32a of the third size vertically and transversely.

The distance between the positioning ribs 104 is equal to the width L of an arm of the third size, i.e. equal to 8 mm. As a result, when an arm 32a of the third size is in the position in which it is assembled to the connector 36, the bottom branch 60 of the U-shaped hook is received between the positioning ribs 104, and the top face 60s is in abutment against the bottom face 86i of the bottom tongue 86.

In addition, the positioning ribs 104 can also be used to take up clearance for mounting arms 32a of certain sizes.

Figure 18:
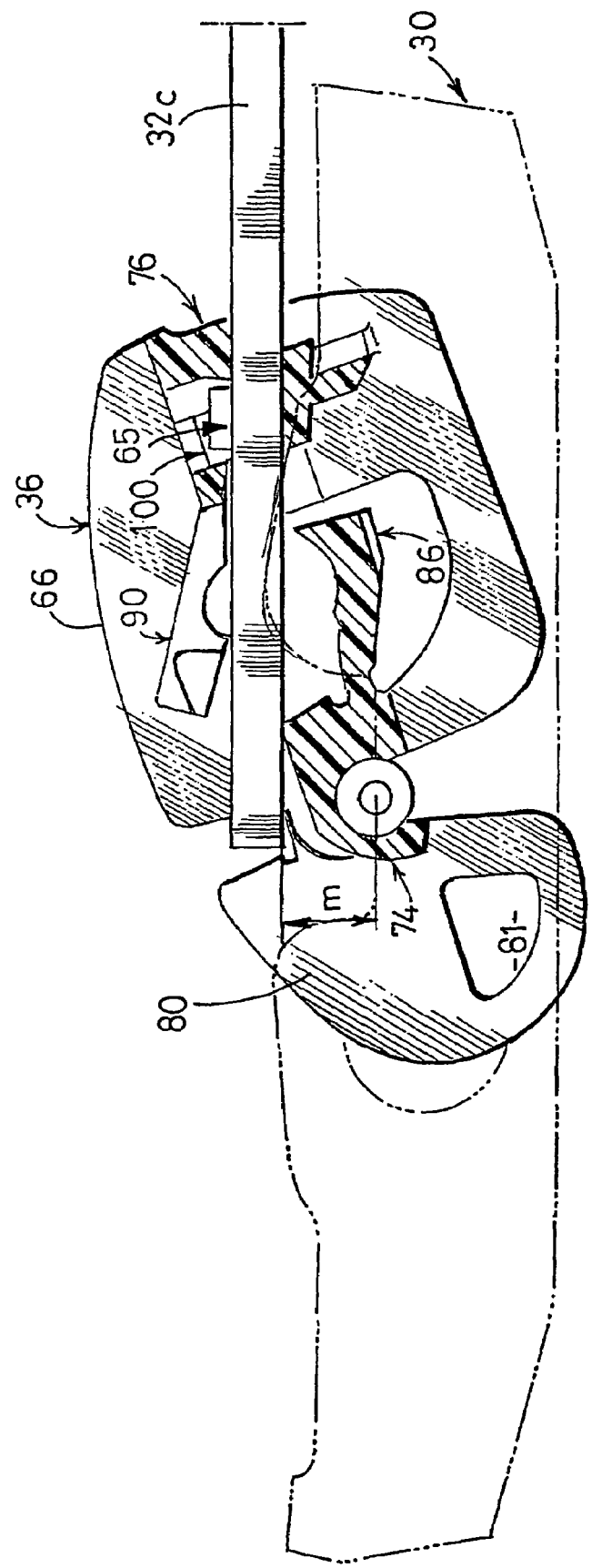
FIG. 18 is a view similar to the FIG. 17 view, in which an arm of the third category is in the position as mounted in the third recess.

In another embodiment of the invention, shown in FIGS. 16 and 18, the clearance take-up means are implemented by means of the top tongue 90 which is also elastically deformable.

The front longitudinal edge 90a of the top tongue 90 is curved downwards so that inserting an arm 32c belonging to the third category of arm into the third recess 96 in the body 69 causes the top tongue 90 to deform upwards to a relatively large extent, so as to cause the films of material 94 to break.

The top tongue 90 is thus deformed elastically upwards, and its free front end 90a exerts a resilient return force on the top face 34s of the end 34 of the arm 32c.

The upward deformation of the top tongue 90 is limited by the fact that the side studs 92 come vertically upwards into abutment against a top edge 82a of the opening 82.

Thus, as shown in FIG. 16, the top tongue 90 exerts a return force directed substantially downwards on the top face 34s of the end 34 of the arm 32c, thereby making it possible to take up clearance between the connector 36 and an arm 32c belonging to the third category of arm, and to prevent the arm 32c from pivoting relative to the connector 36.

As indicated above, the top tongue 90 is suitable for deforming upwards. To make this possible, the openings 82 in the cheek plates 66 via which the studs 92 of the top tongue 90 pass extend vertically so as to allow the studs 92 to move vertically upwards and downwards on inserting the end 54 of an arm 32b, 32c.

However, in order to limit the amplitude of the upward movement of the top tongue 90 when inserting an arm 32c belonging to the third category of arm, the openings 82 of the cheek plates 66 are dimensioned so that the studs 92 of the top tongue 90 come vertically upwards into abutment against the respective top edges 82a of the associated opening 82.

Thus, the deformation of the top tongue 90 remains less than the elastic limit of the material, which makes it possible to use the connector 36 again for connecting the arm 32c to a new wiper blade unit 30.

The connector 36 is designed to be received between the flanges 40 of the main bracket 38 of the wiper blade unit 30. Thus, the back 42 of the main bracket 38 is in general arranged vertically above the third recess 96 of the connector 36, and then hinders insertion of an arm 32c of the third category.

In order for it to be possible to insert an end 34 of an arm 32c of the third category, it is then necessary to pivot the connector 36 about the main hinge axis A. The arm 32c is then inclined relative to the wiper blade unit 30, which can be relatively awkward for using it.

Figure 17:
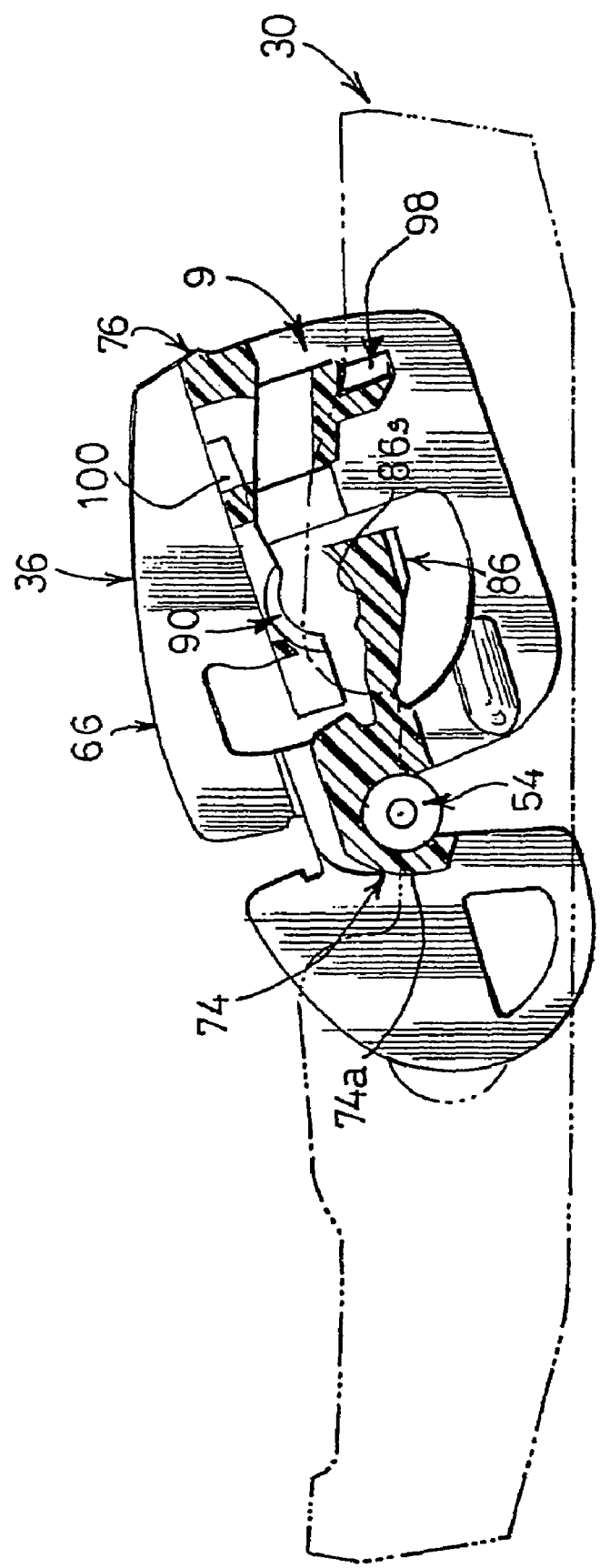
FIG. 17 is a view similar to the FIG. 12 view, showing another embodiment of a connector of the invention, in which the third recess is inclined relative to the main axis of the connector.

That is why, as shown in FIGS. 17 and 18, the main axis of the third pin 96 is inclined relative to the main axis of the connector 36, so that the vertical design dimension of the front end of the third recess is greater than the vertical design dimension of the rear end.

The third recess 96 is then distant from the first axis A by a certain value "m" which is greater than the distance between the top back 42 of the main bracket 39 of the wiper blade unit and the first axis A.

Thus, in order to insert an arm 32c of the third category into the third recess 96, it is always necessary to pivot the connector 36 about the main hinge axis A. However, when the connector 36 is in this position, the third recess 96 is situated above the back 42 of the main bracket 38, and its axis is substantially parallel to the longitudinal direction of the wiper blade unit 30.

The third recess 96 is then defined by the bottom face of the rear top segment, by the top face of the rear bottom segment, and by one edge of the front segment against which a bottom face of the end of the arm bears.

This modification in the inclination of the third recess 96 means that the amplitude through which the top tongue 90 pivots when the arm 32c is in the position in which it is mounted in the recess is relatively large. To accommodate this, the opening 82 in each cheek plate 66 extends vertically over a large distance.

In addition, in order to enable such movement to take place, the stiffness of the top tongue 90 must be low. The top tongue can therefore deform more easily in the event of vibration, the risk of a second pin 62 disengaging from the groove 64 then being increased. That is why, in this variant embodiment of the connector, the films of material 94 do not break on inserting a second pin 62 of the first size, or on inserting a second pin 62 of the second size.

The cheek plates 66 of the connector 36 are described above as each being provided with two openings 82 that respectively pass the second pin 62 of an arm 32b belonging to the second category of arm, and a side stud 92 on the top tongue 90. However, it is to be understood that each cheek plate 66 can be provided with a single opening 82 which consists of the above-described openings joined together.

When the wiper mechanism is operating, and when an arm 32b of the second category is connected to the wiper blade unit 30 via the connector 36, the second pin 62 pivots in the second recess 84.

The second pin 62 of the second size is of large dimensions, its peripheral surface area is thus also large. Thus, while it is moving in the second recess 84, the friction between the second pin 62 and the associated walls of the connector 36 causes major wear on said associated walls.

That wear is a source of considerable amounts of play between the second pin 62 and the connector 36, it being possible for such play to cause the locking element to be disengaged from the groove 64 of the second pin 62 and thus to cause the arm 32b to be disunited from the wiper blade unit 30.

Figure 9:
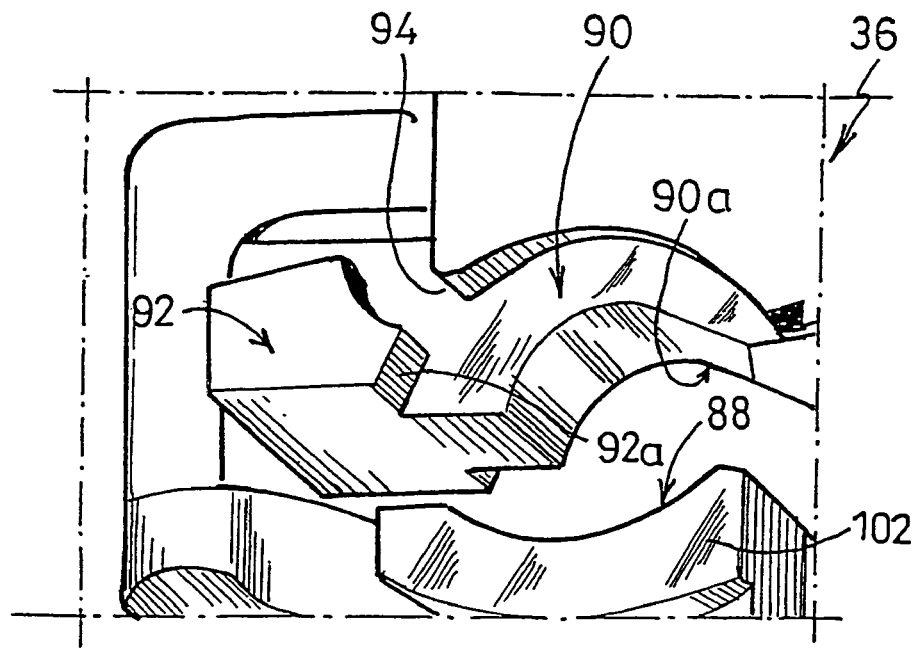
FIG. 9 is a side detail view on a larger scale and in perspective of the front end of the top tongue, showing a variant embodiment of the side studs.
Figure 12:
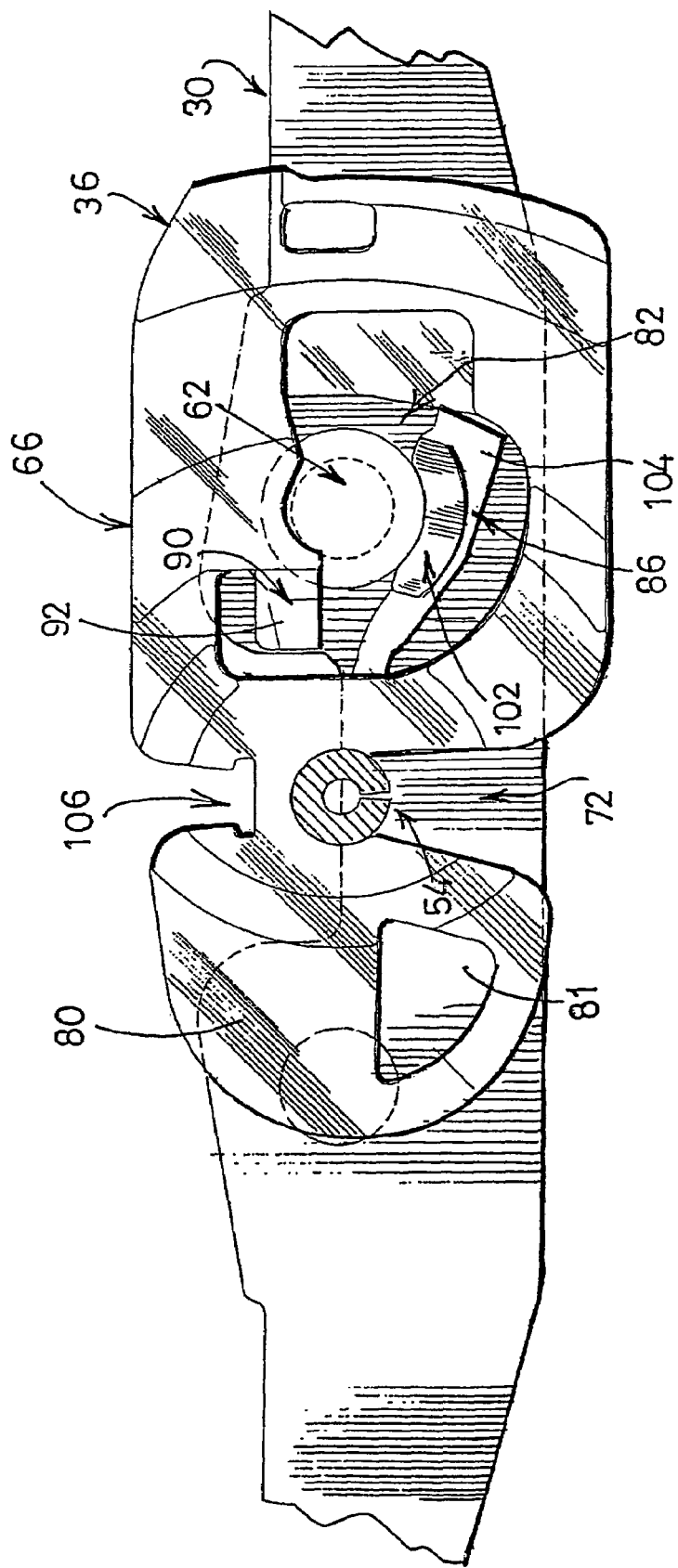
FIG. 12 is a view similar to the FIG. 11 view, and in which the connector connects the blade unit to an arm of the third category, and of the second size.

In another variant embodiment of the invention, and as shown in FIGS. 3, 9, and 12, the areas of contact between the connector 36 and the second pin 62 of the second size are larger than the areas of contact between the connector 36 and a second pin 62 of the first size.

In a first aspect of this variant, the areas of contact are increased at the bottom tongue 86.

For this purpose, as can be seen in FIG. 12, the top face 86s of the bottom tongue 86 is convex, and it is complementary to the outside cylindrical surface of the second pin 62.

In another aspect of this variant, the bottom tongue 86 is provided with two projections 102 that extend transversely towards the outside of the connector 36 from the transverse edge of the bottom tongue 86, and so that their free transverse ends come flush with the outside vertical longitudinal faces 66e of the respective associated cheek plates 66. In addition, the projections 102 are curved so that their top faces 102s are also complementary to the outside cylindrical surface of the second pin 62.

Another surface of contact between the second pin 62 and the connector 36 is situated at a top edge 82s of the opening 82 in each cheek plate 66. Thus, as shown in FIG. 9, the top edge 82s of each opening 82, against which edge the second pin 62 bears, is also curved so as to be complementary to the outside cylindrical surface of the second pin 62.

Finally, as can be seen in more detail in FIG. 9, the side studs 92 of the top tongue 90 are also provided with bearing surfaces 92a for bearing against the outside cylindrical surface of a second pin 62 of the second size that are complementary to the outside cylindrical surface of the second pin 62.

All of these faces thus make it possible to reduce the pressure between the second pin 62 and the connector 36, and thus to limit the wear on the connector.

The opening 82 in each cheek plate 66 is thus defined by a plurality of edges, each of which has a function for operation of the connector 36.

These edges consist of:
- a first top edge 82a, situated at the front of the opening 82, and which acts as an abutment for the side stud 92 associated with the second tongue 90;
- a second top edge 82s, situated at the back of the opening 82, and which has a vertical dimension relative to the connector 36 that is less than the vertical dimension of the first top edge; the second edge is curved so as to form a surface complementary to the outside cylindrical surface of a second pin 62 of the second size, so as to limit wear on the connector 36;
- a rear vertical edge 82b against which the outside cylindrical surface of a second pin 62 of the second size comes to bear for positioning the second pin 62; and
- a bottom edge 82i and a front edge 82c against which edges the projections 102 on the bottom tongue come into abutment to delimit the extent to which the bottom tongue 86 can move.

A connector 36 of the invention makes it possible for a user to connect a wiper blade unit 30 to a drive arm 32a, 32b, 32c without having to worry whether the connector is indeed adapted to the type of arm.

Since this connector 36 accommodates any type of arm, it can then be mounted on the wiper blade unit 30 prior to delivery. Assembling the connector 36 with the wiper blade unit 30 requires means for enabling it to be taken hold of by a manipulator element.

Such means comprise firstly the orifice 100 which is suitable for receiving a centering finger (not shown) on the manipulator element, and they further comprise a notch 106 provided in each cheek plate 66, and that extends vertically downwards from the top surface of the cheek plate 66.

In order to enable the connector 36 to be manipulated, the notch 106 is upside-down T-shaped, i.e. the horizontal branch of the T is situated below its vertical branch. Each notch 106 is suitable for receiving a second finger (not shown) of complementary shape for the purpose of manipulating the connector 36.

In addition, each notch 106 is arranged longitudinally in a manner such that its vertical transverse plane of symmetry is at the same longitudinal dimension as the transverse axis A. Thus, while the connector 36 is being mounted onto the wiper blade unit 30, i.e. while the first hinge pin 54 is being inserted into the first cylindrical recess 70, the second finger of the manipulator element exerts a vertical insertion force that is centered on the transverse hinge axis A, and thus that limits potential deformation of the connector that might damage it.

In a first embodiment of said notches 106, shown in FIG. 4, the bottom edge of the horizontal branch of each notch 106 comes flush with the top face 74s of the front element 74 of the body 68, which makes it possible to exert an insertion force on a larger horizontal area.

Figure 10:
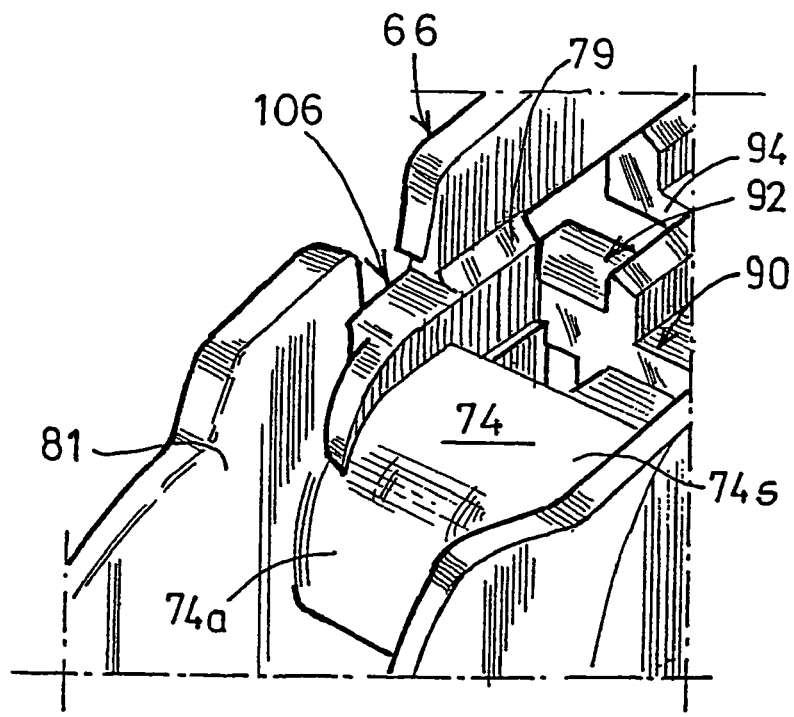
FIG. 10 is a view on a larger scale and in perspective of the front segment of the body of the connector, showing a variant embodiment of the T-shaped notch.
Figure 11:
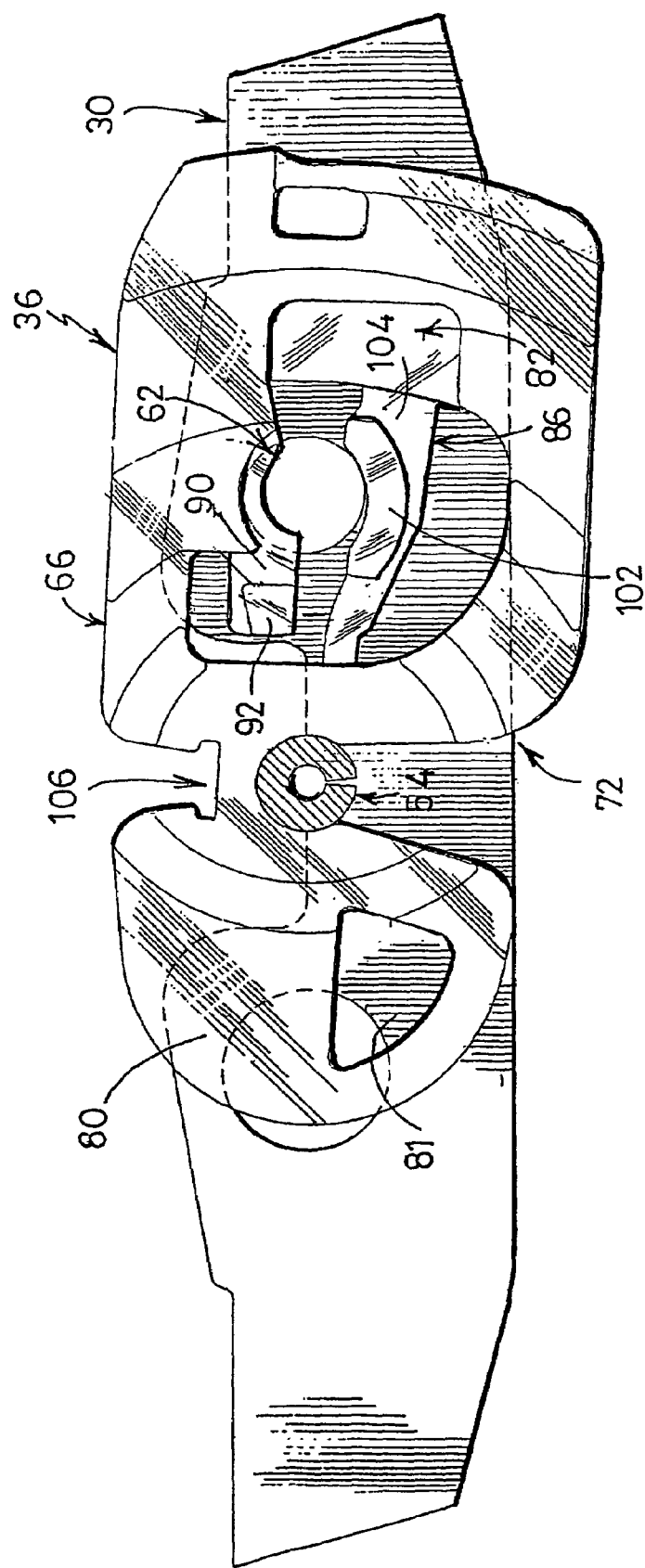
FIG. 11 is a cutaway side view of the connector in the position as mounted in the wiper blade unit, in which position the connector connects the blade unit to an arm of the third category, and of the first size.

In a second embodiment of said notches 106 shown in FIG. 10, the bottom edge of the horizontal branch of each notch 106 extends above the top face 74s of the front element 74 of the body 68. Thus, the associated rib 79 can extend longitudinally forwards to the front end of the front segment 74 of the body 68, thereby making it possible to increase the surface area for supporting the top branch 56 of the U-shaped hook.

When the blade proper 50 of the wiper blade unit 30 is worn, it is necessary to disunite the arm 32a, 32b, 32c from the wiper blade unit 30, i.e. to disunite the arm 32a, 32b, 32c from the connector 36.

Disuniting an arm 32a, 32c of the first or of the third category takes place by means of a longitudinal movement respectively towards the front or towards the rear of the connector 36.

When disuniting an arm 32c of the second category, the top tongue 90 opposes any transverse movement of the arm 32c relative to the connector 36. It is therefore necessary to disengage the second tongue 90 from the groove 64 in the second pin 62 before causing the arm 32c to move transversely relative to the connector 36.

Neither the top tongue 90 nor the bottom tongue 86 comprises graspable means enabling it to be deformed to enable the top tongue 90 to be disengaged from the groove 64.

That is why, as shown in FIG. 13, in order to disengage the top tongue 90 from the groove 64, the connector 36 is caused to pivot about the transverse hinge axis A relative to the main bracket 38 of the wiper blade unit 30, by raising the rear portion of the connector 36, i.e., in this example, by moving the connector 36 counterclockwise.

Since the second pin 62 is stationary, it prevents the bottom tongue 86 from moving upwards. The top tongue 90 is not prevented from moving upwards, and it can thus disengage from the groove 64.

Once the connector 36 has pivoted to an extent sufficient for the top tongue 90 to be disengaged completely from the groove 64, it is possible to remove the second pin 62 by moving the arm 32c transversely.

The connector 36 is caused to pivot by acting on the bottom edges 66b of the cheek plates 66. Since the connector is an element of small dimensions, it is sometimes complex to do this because the cheek plates 66 are sometimes difficult to access.

That is why, in another variant embodiment of the connector 36, as shown in FIG. 15, the connector has a cross-member 108 which interconnects the two cheek plates 66 at their rear bottom ends, which cross-member serves as a drive element for pivoting the connector 36.

It will be understood that simple mechanical inversions can constitute variant embodiments of the invention. For example, the bottom tongue 86 can extend longitudinally forwards from the rear bottom segment 98. Similarly, the top tongue 90 can extend longitudinally rearwards from the front segment 74, without going beyond the technical field of the invention.

Finally, the connector 36 is described above as making it possible to connect a windshield wiper arm 32a, 32b, 32c to a wiper blade unit 30 having a hinged structure. It will be understood that a connector 36 of the invention can also connect an arm 32a, 32b, 32c to a blade unit 30 in which the hinged structure is replaced with a "flat-blade" structure, i.e. a structure having spline members.

The invention claimed is:

1. A connector for connecting one end of a windshield wiper arm to a first transverse hinge pin belonging to a structure element of a wiper blade unit, the connector being suitable for being received at least in part against the inside end wall of the end of an arm that belongs to a first category of arm, which end is in the form of a U-shaped hook, the connector comprising:
   a first recess into which the first hinge pin can be inserted;
   a second recess designed to receive a second transverse pin which belongs to a second category of arm that can be of at least a first size, and which extends transversely from a side edge of the end of the arm,
   wherein said second recess is defined in part by a bottom first tongue that is elastically deformable and that extends substantially longitudinally, a first longitudinal end of which tongue is fastened to the connector, the bottom tongue being suitable for retracting so as to enable the second pin to be inserted, and for causing the second pin to be locked transversely in the position in which it is mounted in the second recess,
   wherein said connector comprises a top tongue that is suitable for being received at least in part in a peripheral groove in the second pin so as to lock the second pin transversely, in association with the bottom tongue,
   wherein the first longitudinal end of the bottom tongue is fastened to a front segment provided to define the first recess.

2. The connector according to claim 1, wherein the connector comprises adapter means so that it is suitable for being received against the inside end walls of ends of arms of the first category and of various sizes.

3. The connector according to claim 2, wherein the adapter means comprise shapes in relief provided on a facing inside longitudinal faces of side cheek plates of the connector.

4. The connector according to claim 1, wherein the top tongue is of a transverse width so as to be received snugly in the peripheral groove.

5. The connector according to claim 1, wherein the top tongue is connected to each of the cheek plates of the connector via films of material whose dimensions are determined so that inserting a second pin of the first size does not cause the films of material to break.

6. The connector according to claim 1, wherein the body comprises the front segment, the front outside wall of the front segment being suitable for being received against the inside end wall of the U-shaped hook of the arm, a top rear segment and a bottom rear segment.

7. The connector according to claim 5 or 6, wherein the rear longitudinal end of the top tongue is fastened to the rear top segment.

8. The connector according to claim 1, wherein it is suitable for receiving the end of a third category of arm, which end consists in a shaped-section member segment that extends substantially longitudinally forwards, in a cylindrical third recess that is open in its rear face.

9. The connector according to claim 8,
wherein the top tongue is connected to each of the cheek plates of the connector via films of material whose dimensions are determined so that inserting a second pin of the first size does not cause the films of material to break, and
wherein an arm of the third category being inserted into the third recess causes the films of material to break.

10. The connector according to claim 8 or claim 9, wherein the rear top segment comprises a vertical orifice that is suitable for receiving a lug on the end of an arm belonging to the third category of arm, which lug projects upwards relative to the top face of the end of the arm, for longitudinally locking the end of the arm in the position in which it is mounted in the third recess.

11. The connector according to claim 1, wherein a portion of the bottom tongue is curved downwards so that, for at least one size of arm belonging to the first category of arm, the bottom tongue is deformed elastically upwards so as to exert a substantially vertical force downwards on the top face of a horizontal bottom segment of the end of the arm.

12. The connector according to claim 1, wherein the top tongue comprises two side studs disposed on either side of the front longitudinal end of the top tongue, which studs extend transversely towards the outside of the connector and pass through respective orifices in the associated side cheek plates so that the free end of each stud comes flush with the outside vertical face of the associated cheek plate.

13. The connector according to claim 12, wherein, when an arm belonging to the third category of arm is in the position in which it is mounted in the third recess, each of the side studs is in vertical abutment against a top edge of the orifice of the associated cheek plate.

14. The connector according to claim 1, wherein the side edges of the bottom tongue are extended transversely outwards by projections.

15. The connector according to claim 14, wherein the projections of the bottom tongue extend transversely while passing through an orifice in the associated side wall so that the free transverse end of each projection comes flush with the outside vertical face of the associated cheek plate.

16. The connector according to claim 15, wherein each projection is curved so that the curvature of its top face is substantially complementary to the outside cylindrical wall of a second pin of the second size.

17. The connector according to claim 1, wherein the free front end of the top tongue is curved downwards so that when the end of an arm belonging to the third category of arm is inserted into the third recess, the top tongue is deformed elastically upwards, and the free front end of the top tongue exerts a return force directed substantially downwards on the top face of the end of the arm.

18. The connector according to claim 1, wherein the front end segment of each cheek plate, which segment extends cantilevered out forwards from the body, is elastically deformable and, on its inside vertical longitudinal face, comprises a ramp-forming abutment so as to retract when the end of an arm belonging to the first category of arm is inserted, and so as to lock the U-shaped hook in the position in which it is mounted around the body of the connector.

19. The connector according to claim 18, wherein the ramp-forming abutment extends over a top portion of the front end segment of the associated cheek plate, and in that a bottom portion of the front end segment comprises an opening for insertion of the U-shaped hook.

20. The connector according to claim 1,
wherein the top tongue is connected to each of the cheek plates of the connector via films of material whose dimensions are determined so that inserting a second pin of the first size does not cause the films of material to break, and
wherein the shapes in relief comprise a rib provided on the inside vertical longitudinal face of each cheek plate of the connector, which rib extends longitudinally above the top face of the rear top segment of the body for positioning the end of an arm belonging to the first category of arm.

21. The connector according to claim 1, wherein the bottom face of the bottom tongue comprises ribs for vertically and/or transversely positioning an arm of the first category and of at least one size.

22. The connector according to claim 21, wherein each positioning rib extends substantially vertically downwards along a side edge of the bottom face of the bottom tongue.

23. The connector according to claim 1,
wherein the top tongue comprises two side studs disposed on either side of the front longitudinal end of the top tongue, which studs extend transversely towards the outside of the connector and pass through respective orifices in the associated side cheek plates so that the free end of each stud comes flush with the outside vertical face of the associated cheek plate, and
wherein each of the side studs comprises a bearing surface for bearing against the outside cylindrical surface of a second pin of the second size, which bearing surface is complementary to said outside cylindrical wall.

24. The connector according to claim 23, wherein the curvature of a top edge of the opening in a cheek plate is substantially identical to the curvature of the outside cylindrical wall of a second pin of the second size.

25. The connector according to claim 1, wherein each cheek plate comprises a notch which extends vertically downwards from its top edge and which is complementary to a manipulator element for manipulating the connector.

26. The connector according to claim 1,
wherein the top tongue is connected to each of the cheek plates of the connector via films of material whose dimensions are determined so that inserting a second pin of the first size does not cause the films of material to break, and
wherein the notch substantially forms an upside-down T-shape in which the bottom edge of the horizontal branch extends vertically above the top face of the front element of the body of the connector.

27. The connector according to claim 26, wherein the ribs extend longitudinally forwards so as to extend to the front end of the front segment of the body of the connector.

28. The connector according to claim 1, wherein it comprises a cross-member that interconnects the rear bottom ends of the cheek plates.

* * * * *